(12) United States Patent
Kelly

(10) Patent No.: US 9,787,606 B2
(45) Date of Patent: Oct. 10, 2017

(54) INLINE NETWORK SWITCH HAVING SERIAL PORTS FOR OUT-OF-BAND SERIAL CONSOLE ACCESS

(71) Applicant: Tadhg Kelly, Boonton, NJ (US)

(72) Inventor: Tadhg Kelly, Boonton, NJ (US)

( * ) Notice: Subject to any disclaimer, the term of this patent is extended or adjusted under 35 U.S.C. 154(b) by 336 days.

(21) Appl. No.: 14/161,933

(22) Filed: Jan. 23, 2014

(65) Prior Publication Data

US 2014/0204955 A1    Jul. 24, 2014

Related U.S. Application Data

(60) Provisional application No. 61/756,218, filed on Jan. 24, 2013.

(51) Int. Cl.
*H04W 52/00* (2009.01)
*H04L 12/935* (2013.01)
(Continued)

(52) U.S. Cl.
CPC ............... *H04L 49/30* (2013.01); *H04J 3/26* (2013.01); *H04L 61/20* (2013.01); *H04W 52/00* (2013.01); *H04L 29/12028* (2013.01)

(58) Field of Classification Search
CPC ............... H04L 49/30; H04L 29/06823; H04L 29/12028; H04L 61/20; H04B 7/2612; H04W 48/02; H04W 52/00; H04J 3/26
See application file for complete search history.

(56) References Cited

U.S. PATENT DOCUMENTS 6,651,190 B1   11/2003  Worley et al.
6,678,826 B1   1/2004   Kelly et al.
(Continued)

FOREIGN PATENT DOCUMENTS

CN   1571351 A    7/2003
EP   1715621 A2   10/2006
(Continued)

OTHER PUBLICATIONS

RFC 3022, "Traditional IP Network Address Translator (Traditional NAT)", Jan. 2001.*

(Continued)

*Primary Examiner* — Salvador E Rivas
(74) *Attorney, Agent, or Firm* — Gearhart Law LLC

(57) ABSTRACT

Systems, methods and apparatus regarding network configuration and network switches including an in-line Network Console Access (NETCONA) Device having a NETCONA Management Module, a NETCONA WAN-side Port, a NETCONA LAN-side Port, and at least one NETCONA Serial Console Access Port. The NETCONA Device may share a single IP address for "out-of-band" access to network appliances at a network edge point. The NETCONA Device uses packet forwarding to transparently transfer data between a WAN and a LAN. Data packets having console access information are forwarded to the NETCONA Management Module for processing. An exemplary network system includes an in-line NETCONA Device and at least one Network Appliance; wherein the Network Appliance includes a Network Appliance Serial Console Access Port; and wherein the NETCONA Serial Console Access Port is coupled with the Network Appliance Serial Console Access Port to enable Serial Console Access. Numerous other aspects are provided.

20 Claims, 5 Drawing Sheets

(51) Int. Cl.
*H04L 29/12* (2006.01)
*H04J 3/26* (2006.01)

(56) References Cited

U.S. PATENT DOCUMENTS

| | | | |
|---|---|---|---|
| 6,983,325 | B1 | 1/2006 | Watson et al. |
| 7,174,375 | B2 | 2/2007 | King et al. |
| 7,466,713 | B2 | 12/2008 | Saito |
| 7,552,213 | B2 | 6/2009 | De Oliveira et al. |
| 7,680,085 | B2 | 3/2010 | Willins et al. |
| 7,710,867 | B1 | 5/2010 | Masters |
| 7,853,682 | B2 | 12/2010 | Holt et al. |
| 7,941,551 | B2 | 5/2011 | Anantharaman et al. |
| 8,024,477 | B2 | 9/2011 | Rothman et al. |
| 8,078,873 | B2 | 12/2011 | Shah et al. |
| 2006/0215659 | A1* | 9/2006 | Rothman ............... H04L 41/12 370/392 |
| 2006/0242271 | A1* | 10/2006 | Tucker ................. H04L 41/08 709/220 |
| 2006/0259612 | A1 | 11/2006 | De Oliveira et al. |
| 2006/0285544 | A1 | 12/2006 | Taylor et al. |
| 2009/0201917 | A1* | 8/2009 | Maes ..................... H04L 12/66 370/352 |
| 2010/0132017 | A1* | 5/2010 | Robinson ............... H04L 63/08 726/5 |
| 2011/0085564 | A1 | 4/2011 | Taylor et al. |
| 2011/0189985 | A1 | 8/2011 | Gao et al. |
| 2012/0203393 | A1* | 8/2012 | Dumitru ................ G06F 1/206 700/300 |
| 2013/0115998 | A1* | 5/2013 | Lamm ................. H04W 52/221 455/522 |

FOREIGN PATENT DOCUMENTS

| | | |
|---|---|---|
| WO | 2006005047 A2 | 1/2006 |
| WO | 2007024458 A2 | 3/2007 |

OTHER PUBLICATIONS

RFC 2663, "IP Network Address Translator (NAT) Terminology and Consideration", Aug. 1999.*
UK Intellectual Property Office, Search Report under Section 17(5), in relation to application GB1401128.2, mailed Jul. 8, 2014.

* cited by examiner

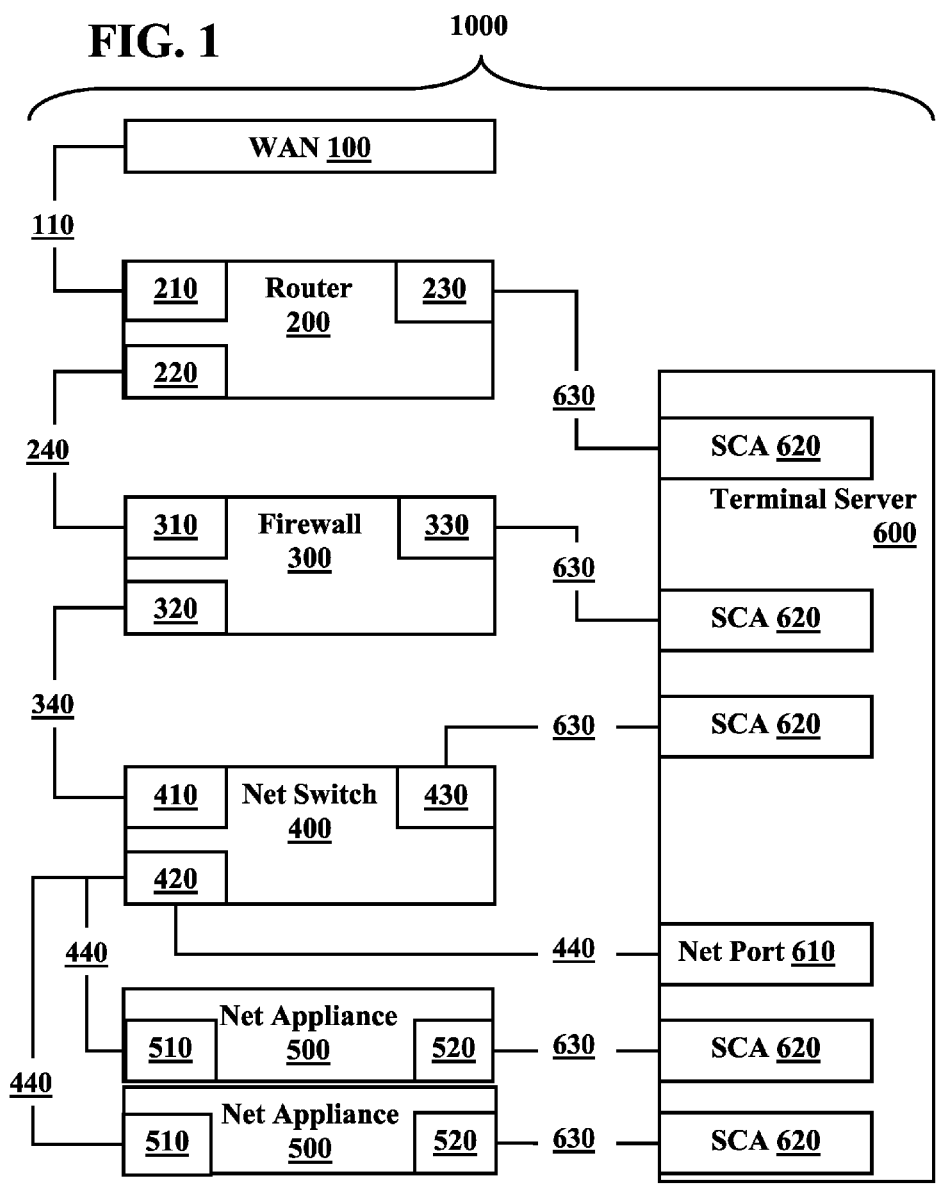

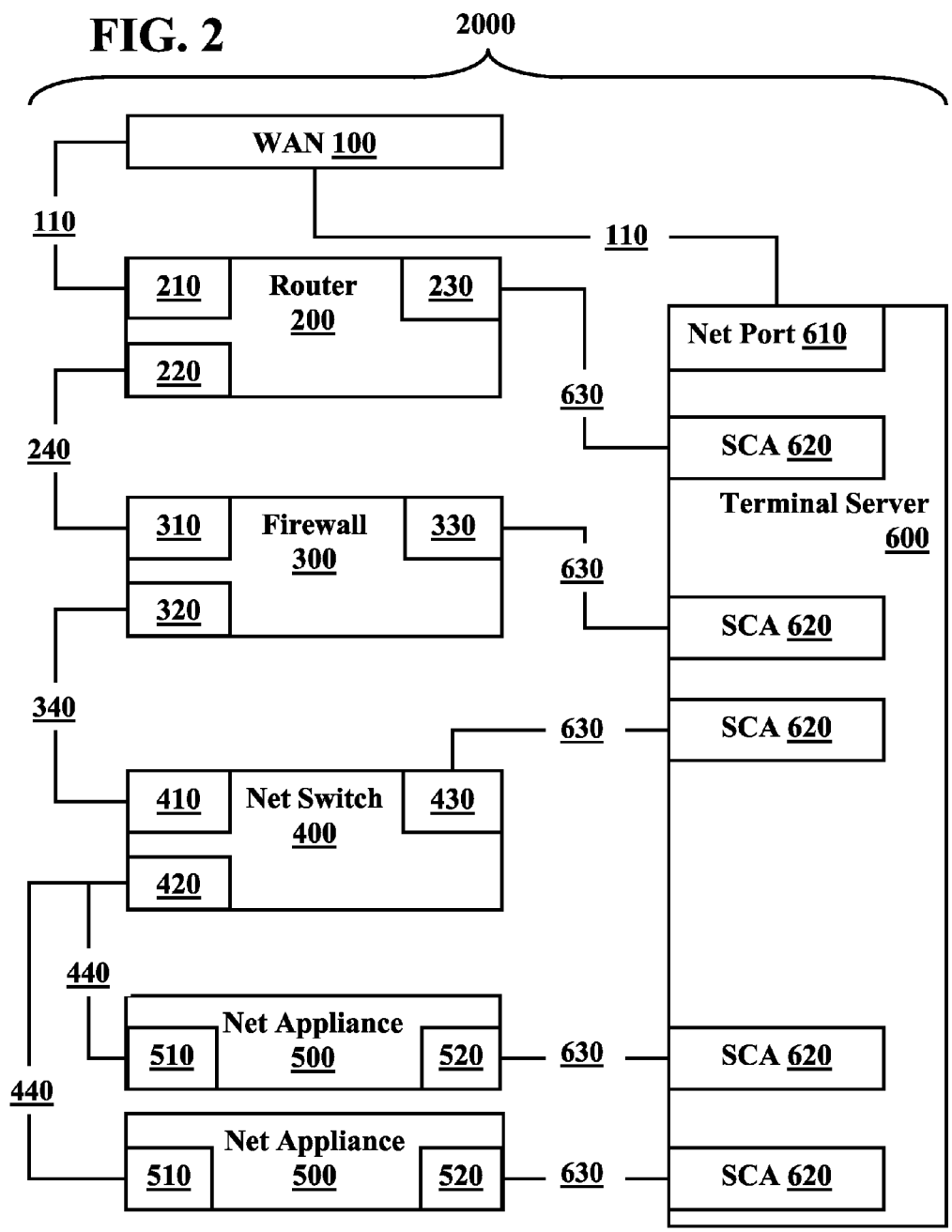

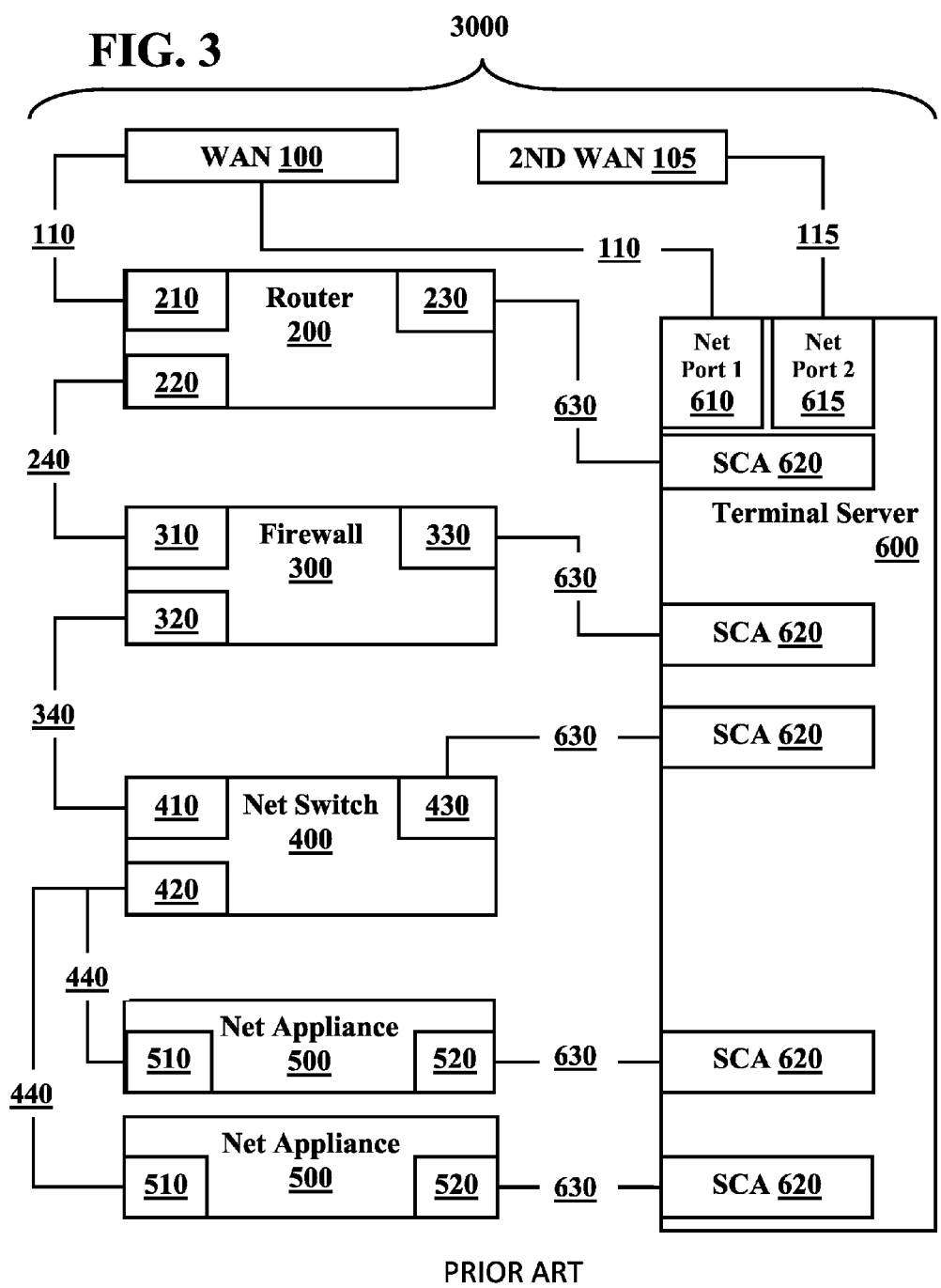

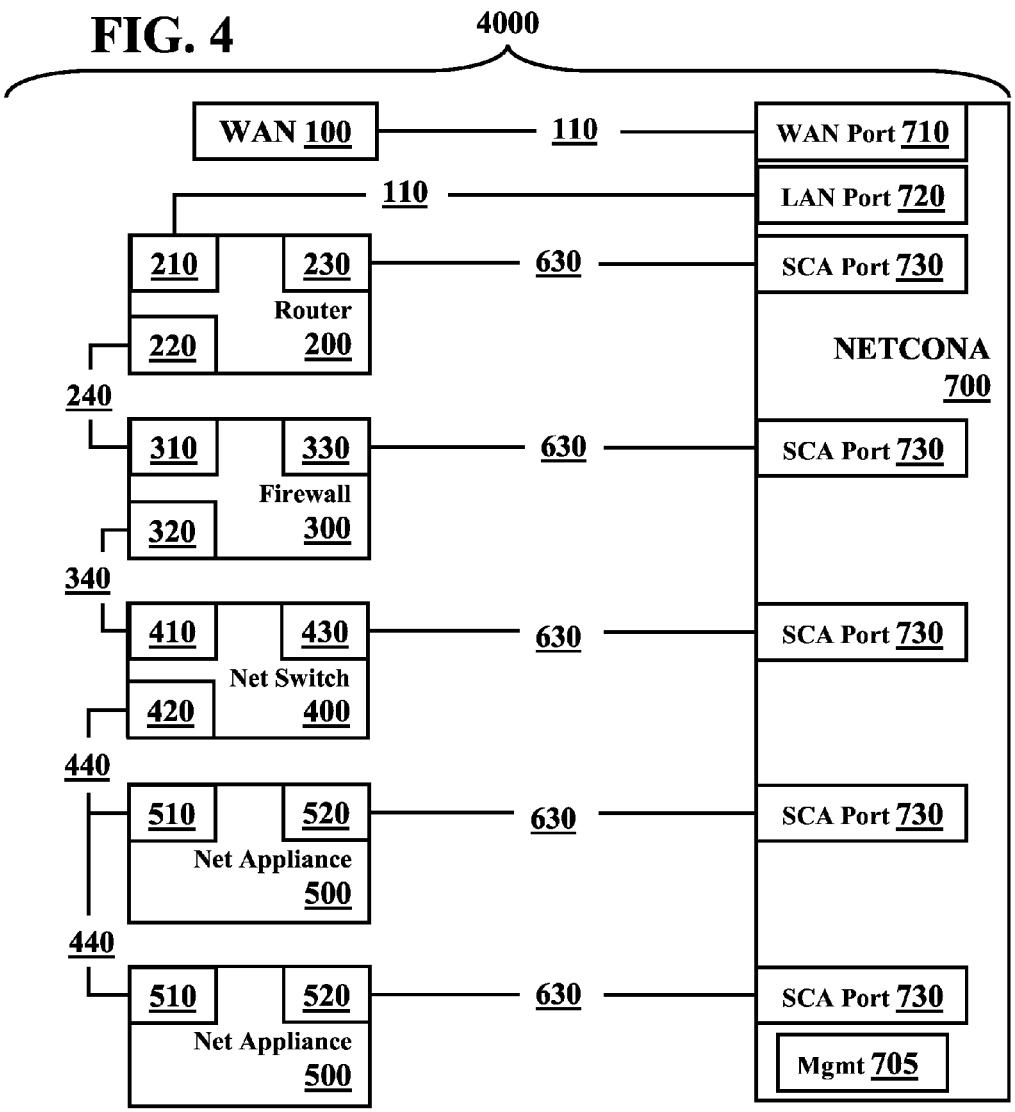

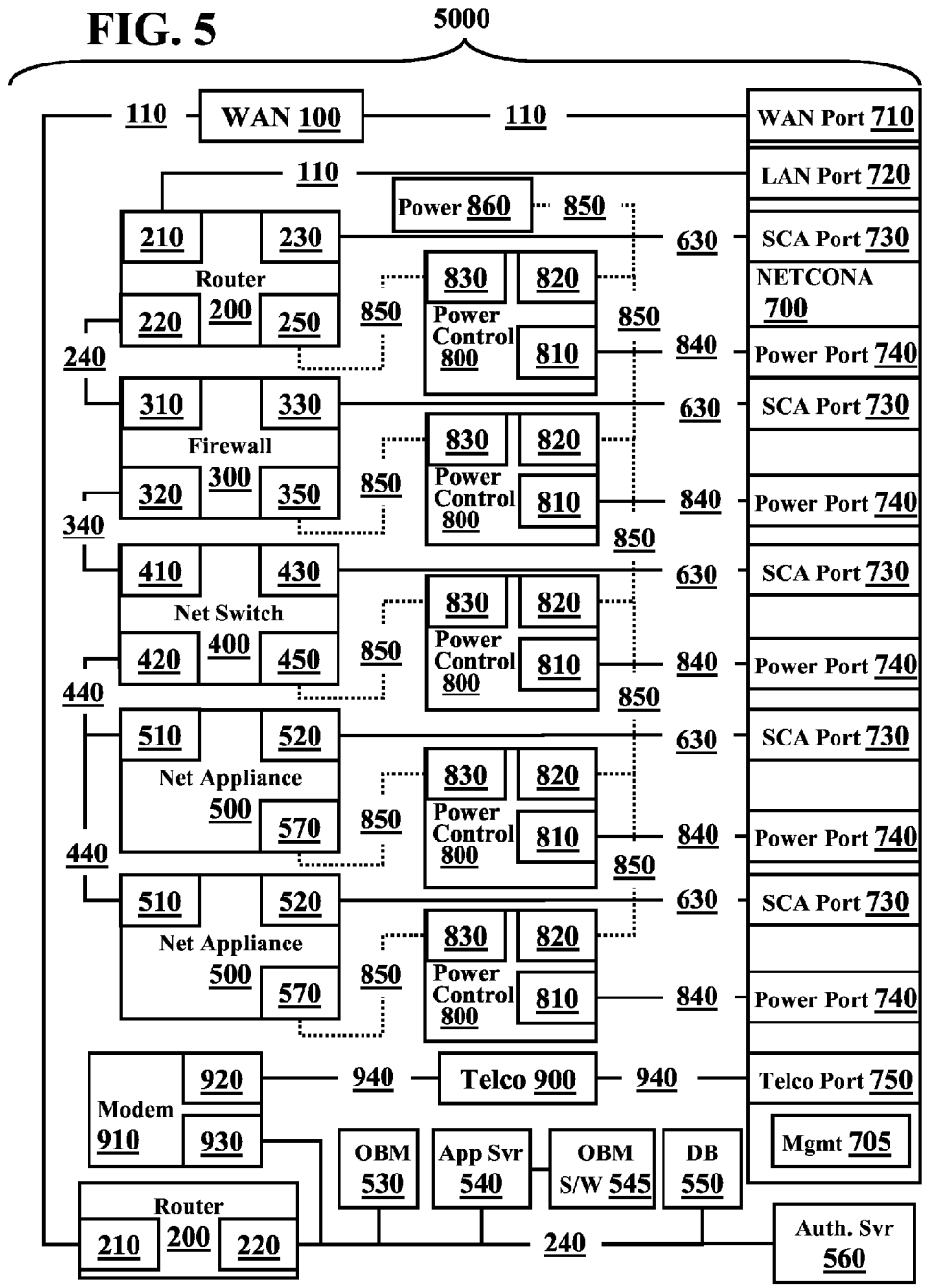

INLINE NETWORK SWITCH HAVING SERIAL PORTS FOR OUT-OF-BAND SERIAL CONSOLE ACCESS

CLAIM OF PRIORITY

This application is a utility application claiming priority to U.S. Application Ser. No. 61/756,218 filed on Jan. 24, 2013 entitled "Inline Network Switch Having Serial Ports For Out-Of-Band Serial Console Access," which is herein incorporated by reference in its entirety.

BACKGROUND OF THE INVENTION

Field of the Invention

The invention relates to systems, methods and apparatus involving computer networks, network configurations and network switches. In particular, the invention involves out-of-band serial console access to network appliances within a network configuration.

Description of Related Art

The related art includes, for instance, assorted network systems having network switches in various network configurations. A network system having a given network configuration typically will have distributed network switches for communication with remote network appliances via a shared network connection.

A network system may be part of an enterprise network, which could be, for instance, a large-scale commercial, government, or military network, a large global multinational network, a large national network, a large educational network, or some extension of the Internet at-large. A network system typically has a data center and a network operations center at its core. A data center is a large network node where quantities of computers, network switches, and network appliances reside. A data center usually is manned 24×7 and is outfitted with backup power sources and a failover to a backup data center. A network operations center ("NOC") is a management center specifically built to manage large enterprise networks, support the configuration and uptime of the network, and is manned 24×7 with network engineers. Some people use the terms data center and NOC interchangeably.

The distant portions within a network system may be considered network edge points, which are remote sites that typically are populated with, for instance, a router, a firewall, a network switch, and one or more network appliances, such as general purpose computers or specific purpose devices. A network appliance may be any device connected to the network, including, for example, a router, a firewall, a network switch, a print server, an intrusion detection device, an application specific device, or a general purpose computer. Network appliances may communicate with other network appliances through a plurality of network connections. The network edge points typically do not have technical personnel onsite and may be managed 100% remotely by a network operations center.

In some instances, a network appliance may need to be managed directly, such as for an application update or fix. Network appliance management often uses a command line interface (CLI), which uses root commands that an operating system will understand. A user located in an NOC, for instance, may need to remotely manage a network appliance at a network edge point. In some instances, appliance management may occur over the network connection. Network-based appliance management may use Telnet, a clear text network protocol that allows access to remote network devices through the network. Moreover, Secure Shell (SSH) is a secure version of Telnet to provide an encrypted terminal session with a remote device on a network. This method requires that the appliance be functioning and that the network connection be functioning, and that the appliance be connected to the network connection, which typically requires that up-network network appliances, such as a router, also be functioning.

In other instances, appliance management may occur through an appliance's console access port, instead of through a network port, and over serial console access between the user's computer and the console access port. Almost all enterprise-level network appliances contain a serial console port for configuration. The console access port was created to ensure a method to communicate directly with the operating system of the device. A console access port generally uses CLI for configuration and management. The console access port is used for configuration and management only, which may occur directly via a connection to a laptop serial port, or indirectly via an appliance management device's serial port. Serial console access between an appliance and a remote user may occur, for instance, through a terminal server, which is a network appliance that has console access ports that connect directly to the console access ports of the network appliances at the network edge point. Terminal server console access typically assumes CLI appliance management.

A terminal server may use "out of band" (OOB) connection for appliance management. True out of band management involves methods to access a network device for management purposes using communication separate from the network connection. For example, OOB management might use a dial-up modem with a network terminal server connected to a console port to manage a remote device even if the network is not present or configured correctly. Today there are three schools of thought on Out of Band Management (OBM): (1) use a phone line connected to a device with a modem and several serial ports (true out of band access); (2) use a cellular modem connected to a device with several serial ports (true out of band access); and (3) use a Terminal or Console server with a network connection and several serial ports (this is not true out of band access, but it is much less costly as there are no recurring fees associated with the secondary circuit).

In summary, the method that an NOC typically uses to manage remote sites is to use CLI access to network devices in order to configure them. CLI is keystroke terminal data and is defined as either:

(1) A direct serial connection to the console port found on almost all network devices of substance (routers, firewalls, VOIP switches, managed switches, etc). This is usually accomplished by connecting a laptop directly to the serial port or an OOB management device that provides remote access to the serial port.

(2) A remote network connection using the SSH protocol. This is usually accomplished by an engineer in the NOC who enters the IP address in a simple SSH client software that provides a remote encrypted terminal session to the network appliance.

While a network appliance can be accessed for CLI through its network port, the most common way to ensure CLI access to remote sites is to install hardware, such as a terminal server, also known as a console server, that provides network access to the serial console access ports on all the network appliances. Attaching to the serial port improves reliability because the appliance can be contacted even if its network interface loses its configuration. A terminal server typically has a network interface and some number of serial ports. Each serial port can be connected to a console access port on a network appliance. In order to communicate to the terminal server, each network port usually requires its own IP address, independent of the IP address of a nearby router, usually at a cost from the network provider, which incurs a cost to the edge point to purchase this additional IP address. As cloud computing has increased, however, IP addresses have become more expensive, because cloud computing requires the assignment of increasingly more IP addresses.

When the NOC wants to contact the network appliance via the console access port, it performs a Telnet or SSH connection to the terminal server over the network, and then selects the appropriate serial port connected to that network appliance. Once the access is made, the NOC has CLI access to the network appliance. Inasmuch as this connection is made through the network appliance's serial console access port, many consider the connection to be "out of band" even though the original access is provided using the primary network, which is considered "in band." The placement of the terminal server is important as to what type of access the NOC will have to the site.

The most typical installation places the terminal server behind the firewall, which has the security advantage that, by being behind the firewall, the terminal server is in the security zone already established by the firewall. The disadvantages include that the device will require its own IP address to be mapped through the router and firewall, and that the device can only be reached if the router, firewall, and network switch, are all functioning.

The least common placement of the terminal server is parallel to, i.e., next to, the router. The advantage to a parallel placement is that the terminal server can now be reached regardless of the status of the router, firewall or network switch. The disadvantage of parallel placement is that the terminal server is now in front of the firewall and therefore outside the security zone. The terminal server is sitting directly on the internet, which is considered "untrusted" for obvious reasons. For security, the terminal server usually uses Remote Authentication Dial In User Server (RADIUS) (a software server run on a server to authenticate users from any device running a RADIUS client) or TACACS+, which would now have to come from the internet as the terminal server is in front of the router and firewall. This is typically not achievable or recommended.

A third option is to use a terminal server having dual network interfaces, which allows placement of the terminal server next to the router, and allows access to the terminal server over a redundant, backup IP circuit, independent of the primary network. The advantages include that the terminal server may be accessed regardless of the status of the primary network, inasmuch as there is a secondary path to the terminal server via the redundant backup network access. The disadvantages include the cost and infrastructure, insofar as (1) a fixed IP address needs to be purchased for each network interface of the terminal server, and the network edge point may need to pay for a redundant, backup IP network connection, which preferably should be completely independent of the primary network (i.e., not using same carrier etc.).

To the extent that each of these aforementioned terminal server placements has its own disadvantages, new systems, methods and apparatus for serial console access are desired to improve performance and reduce costs.

BRIEF SUMMARY OF THE INVENTION

The invention is directed to systems, methods and apparatus involving an in-line network switch having serial ports for out-of-band (OOB) serial console access, wherein the in-line network switch includes dual network ports for transparent data flow between a WAN and a LAN of a network edge point, wherein the network switch shares a single IP address assigned to the network edge point.

In accordance with a first aspect of the invention, a network switch is disclosed, wherein the network switch comprises an in-line Network Console Access (NETCONA) Device having a NETCONA Management Module, a NETCONA WAN-side Port, a NETCONA LAN-side Port, and at least one NETCONA Serial Console Access Port.

In accordance with a second aspect of the invention, a network system is disclosed, wherein a network system comprises an in-line NETCONA Device and at least one Network Appliance; wherein the NETCONA Device comprises a network switch having a NETCONA Management Module, a NETCONA WAN-side Port, a NETCONA LAN-side Port, and at least one NETCONA Serial Console Access Port; wherein the at least one Network Appliance includes a Network Appliance Serial Console Access Port; and wherein the NETCONA Serial Console Access Port is coupled with the Network Appliance Serial Console Access Port.

In accordance with a third aspect of the invention, a method of configuring a network switch is disclosed, wherein the method comprises: providing a NETCONA Device having a NETCONA Management Module, a NETCONA WAN-side Port, a NETCONA LAN-side Port, and at least one NETCONA Serial Console Access Port; configuring the NETCONA Device to use packet forwarding to transfer data between the NETCONA WAN-side Port and the NETCONA LAN-side Port, configuring the NETCONA Device to intercept data packets having serial console access instructions and forward these data packets to the NETCONA Management Module; configuring the NETCONA Management Module to process data packets having serial console access instructions; and configuring the NETCONA Management Module to use the at least one NETCONA Serial Console Access Port to generate Serial Console Access.

In accordance with a fourth aspect of the invention, a method of configuring a network system is disclosed, wherein the method comprises: providing a NETCONA Device having a NETCONA Management Module, a NETCONA WAN-side Port, a NETCONA LAN-side Port, and at least one NETCONA Serial Console Access Port; providing at least one Network Appliance having a Network Appliance Serial Console Access Port; and coupling the NETCONA Serial Console Access Port with the Network Appliance Serial Console Access Port. The method may further comprise using packet forwarding to transfer data between the NETCONA WAN-side Port and the NETCONA LAN-side Port; intercepting data packets having serial console access instructions; forwarding these data packets to the NETCONA Management Module; processing these data packets with the NETCONA Management Module; and generating Serial Console Access from the at least one NETCONA Serial Console Access Port to the Network Appliance Serial Console Access Port.

In accordance with a fifth aspect of the invention, a method of performing console access management is disclosed, wherein the method comprises: transferring data packets through a NETCONA Device having a NETCONA Management Module, a NETCONA WAN-side Port, a NETCONA LAN-side Port, and at least one NETCONA Serial Console Access Port; using packet forwarding to transfer the data packets between the NETCONA WAN-side Port and the NETCONA LAN-side Port; intercepting data packets having serial console access instructions; forwarding these data packets to the NETCONA Management Module; processing these data packets with the NETCONA Management Module; and generating Serial Console Access from the at least one NETCONA Serial Console Access Port to a Network Appliance Serial Console Access Port coupled to the at least one NETCONA Serial Console Access Port.

The details of exemplary embodiment of the invention are set forth in the accompanying drawings and the description below. Other features, objects, and advantages of the invention will be apparent from the description and drawings, and from the claims.

BRIEF DESCRIPTION OF THE DRAWINGS

By reference to the appended drawings, which illustrate one or more exemplary embodiments of this invention, the detailed description provided below explains in detail various features, advantages and aspects of this invention. As such, features of this invention can be more clearly understood from the following detailed description considered in conjunction with the following drawings, in which the same reference numerals denote the same elements throughout. Any exemplary embodiment illustrated in the drawings is not intended to be to scale and is not to be considered limiting of its scope, for the invention may admit to other equally effective embodiments.

FIG. 1 shows a schematic block diagram of a first network configuration, configured in accordance with the prior art.

FIG. 2 shows a schematic block diagram of a second network configuration, configured in accordance with the prior art.

FIG. 3 shows a schematic block diagram of a third network configuration, configured in accordance with the prior art.

FIG. 4 shows a schematic block diagram of a fourth network configuration, configured in accordance with aspects of the invention.

FIG. 5 shows a schematic block diagram of a fifth network configuration, configured in accordance with aspects of the invention.

DETAILED DESCRIPTION

As discussed above, the prior art typically has used a terminal server in one of three configurations to achieve serial console access to network appliances at a network edge point. In contrast, the present invention uses an inline network switch, rather than a terminal server, to achieve serial console access. To understand these configurations, and their differences, the three prior art configurations will be discussed before discussing configurations according to the present invention.

FIG. 1 shows a schematic block diagram of a First Network Configuration 1000, configured in accordance with the prior art, depicting an installation placing a terminal server behind a firewall. First Network Configuration 1000 includes a Wide-Area Network (WAN) Port 100 that may be connected to the Internet, such as via a modem output of a coaxial cable network or fiber optic cable network. In some cases, as shown in FIG. 3, a Redundant WAN Port 105 may be present as well. WAN Port 100 may provide a Raw WAN Connection 110, such as to the Internet. Likewise, as in FIG. 3, Redundant WAN Port 105 may provide a Redundant, Backup Raw WAN Connection 115. In FIG. 1, WAN Connection 110 is connected to a Router 200. Router 200 begins the network edge point, comprising a Local-Area Network (LAN). Router 200 may include a Router WAN-side Port 210 (for receiving WAN Connection 110), a Router LAN-side Port 220, and a Router Serial Console Access Port 230. Router WAN-side Port 210 receives WAN Connection 110. Router 200 outputs a Routed LAN Connection 240 through Router LAN-side Port 220.

Router Serial Console Access Port 230 may be used to manage Router 200 using CLI. As shown in FIG. 5, Router 200 also may have a Router Power Input 250. Routed LAN Connection 240 may connect to a Firewall 300. Firewall 300 may be a hardware device, or a software installation, such as on Router 200. In FIG. 1, Firewall 300 is a separate device having a Firewall WAN-side Port 310, a Firewall LAN-side Port 320, and a Firewall Serial Console Access Port 330. Firewall LAN-side Port 320 may receive Routed LAN Connection 240. Firewall 300 may output a Firewalled Routed LAN Connection 340 from Firewall LAN-side Port 320. Firewall Serial Console Access Port 330 may be used to manage Firewall 300 using CLI. As shown in FIG. 5, Firewall 300 also may have a Firewall Power Input 350.

Firewalled Routed LAN Connection 340 may connect to a Network Switch 400. Network Switch 400 may include a Network Switch WAN-side Port 410, a Network Switch LAN-side Port 420, and a Network Switch Serial Console Access Port 430. Network Switch WAN-side Port 410 may receive Firewalled Routed LAN Connection 340. Network Switch 400 may output a Switched Firewalled Routed LAN Connection 440. Network Switch Serial Console Access Port 430 may be used to manage Network Switch 400 using CLI. As shown in FIG. 5, Network Switch 400 also may have a Network Switch Power Input 450.

Switched Firewalled Routed LAN Connection 440 may connect to a Network Appliance 500. Network Appliance 500 may include a Network Appliance Network Port 510 and a Network Appliance Serial Console Access Port 520. Examples of specific Network Appliances 500 shown in FIG. 5 include an Out of Band Management (OBM) Secure Terminal 530, an Application Server 540 running OBM Management Software 545, a Database Server 550, and an Authentication Server 560. Also as shown in FIG. 5, Network Appliance 500 may include a Network Appliance Power Input 570.

First Network Configuration 1000 also includes a Terminal Server 600. Terminal Server 600 is placed behind Firewall 300 in accordance with the prior art. Terminal Server 600 may include a Terminal Server Network Port 610, a Terminal Server Redundant/Backup Network Port 615 as shown in FIG. 3, and a Terminal Server Serial Console Access Port 620. Terminal Server Network Port 610 is shown in FIG. 1 as connected to Network Switch 400 via Switched Firewalled Routed LAN Connection 440. Terminal Server Serial Console Access Port 620 may connect with Router Serial Console Access Port 230, Firewall Serial Console Access Port 330, Network Switch Serial Console Access Port 430, Network Appliance Serial Console Access Port 520, or any combination thereof, to generate Serial Console Access 630.

In First Network Configuration 1000, Terminal Server 600 has the security advantage that it connects to the WAN through Firewall 300 and is in the security zone established by Firewall 300. The disadvantages include that the Terminal Server 600 will require its own IP address to be mapped through Router 200 and Firewall 300, meaning that First Network Configuration 1000 requires at least two independent IP addresses at the network edge point, a first IP address for Router 200, and a second IP address for Terminal Server

600. Also, Terminal Server 600 can only be reached if Router 200, Firewall 300, and Network Switch 400, are all functioning.

FIG. 2 shows a schematic block diagram of a Second Network Configuration 2000, configured in accordance with the prior art. Second Network Configuration 2000 includes all the same components of First Network Configuration 1000, but instead of Terminal Server 600 being connected to Network Switch 400 via Switched Firewalled Routed LAN Connection 440, Terminal Server 600 is connected to WAN Port 100 via Raw WAN Connection 110. In this placement, Terminal Server 600 is parallel to, i.e., next to, Router 200, allowing Terminal Server 600 to be reached regardless of the status of the Router 200, Firewall 300, or Network Switch 400. However, Terminal Server 600 is in front of Firewall 300 and therefore outside the security zone. Insofar as Terminal Server 600 is sitting directly on the Internet, securing communicating with Terminal Server 600 using RADIUS or TACACS+ would now have to come from the Internet, which is typically not achievable or recommended. Second Network Configuration 2000 also requires at least two independent IP addresses at the network edge point, a first IP address for Router 200, and a second IP address for Terminal Server 600.

FIG. 3 shows a schematic block diagram of a Third Network Configuration 3000, configured in accordance with the prior art. Third Network Configuration 3000 includes all the components of First and Second Network Configurations 1000, 2000, and additionally includes Redundant WAN Port 105 that may provide Redundant, Backup Raw WAN Connection 115. Terminal Server 600 of FIG. 3 has dual network interfaces, Terminal Server Network Port 610 and Terminal Server Redundant/Backup Network Port 615. These dual network interfaces allow placement of Terminal Server 600 next to Router 200, and allow Terminal Server 600 to access Redundant WAN Port 105 over Redundant, Backup Raw WAN Connection 115, independent of the primary network and connection, WAN Port 100 and Raw WAN Connection 110. As such, Terminal Server 600 may be accessed via the secondary path regardless of the status of the primary network.

Third Network Configuration 3000 requires at least three independent IP addresses at the network edge point, a first IP address for Router 200, a second IP address for Terminal Server Network Port 610, and a third IP address for Terminal Server Redundant/Backup Network Port 615. Third Network Configuration 3000 incurs additional costs and needs additional infrastructure, insofar as Terminal Server 600 needs a fixed IP address for each network interface, and the network edge point needs to install, service, and pay for Redundant WAN Port 105 and Redundant, Backup Raw WAN Connection 115, which preferably should be completely independent of the primary network (i.e., not using same carrier etc.).

In contrast to the First, Second, and Third Network Configurations 1000, 2000, 3000, network configurations in accordance with the present invention avoid many of the disadvantages of the prior art, and achieve advantages not possible with the prior art. The present invention involves a secure enterprise device for true out of band management that can provide secure out of band access to a remote site without having a separate IP address and is available regardless of the status of Router 200, Firewall 300, or Network Switch 400, while still providing strong two factor authentication and security. In particular, embodiments of the present invention include an in-line Network Console Access (NETCONA) device with two network interfaces and several serial ports.

FIG. 4 shows a schematic block diagram of a Fourth Network Configuration 4000, configured in accordance with aspects of the invention. Fourth Network Configuration 4000 includes a NETCONA Inline Network Switch and Console Access Device 700. NETCONA Device 700 may be inserted between Router 200 and WAN Port 100 in an "in-line" fashion that will allow Router 200 transparent access to WAN Port 100, using the original IP address of Router 200, avoiding the need to purchase additional IP addresses. Inherent in NETCONA Device 700 is a NETCONA Management Module 705, implemented either as hardware, software, or a combination thereof, for OOB Management of respective network appliances. NETCONA Management Module 705 also may include all security and networking functionality selected for a given embodiment of NETCONA Device 700. NETCONA Device 700 includes a NETCONA WAN-side Port 710, a NETCONA LAN-side Port 720, and at least one NETCONA Serial Console Access Port 730. As shown in FIG. 5, NETCONA Device 700 also may include at least one NETCONA Power Control Port 740 and a NETCONA Telco Port 750. NETCONA Serial Console Access Port 730 and NETCONA Power Control Port 740 may be considered NETCONA Management Ports, generically speaking, that generates Management Access. Serial Console Access 630 would be an example of such Management Access generated by a NETCONA Management Port.

NETCONA WAN-side Port 710 may connect to WAN Port 100 over Raw WAN Connection 110. NETCONA LAN-side Port 720 may connect to Router WAN-side Port 210 over Raw WAN Connection 110 passed through NETCONA Device 700. NETCONA Serial Console Access Ports 730 may connect to Router Serial Console Access Port 230, Firewall Serial Console Access Port 330, Network Switch Serial Console Access Port 430, Network Appliance Serial Console Access Port 520, or any combination thereof, to generate Serial Console Access 630.

NETCONA Device 700 is "in-line" with the primary network circuit and acting as a switch. NETCONA Device 700 shares the IP address of Router 200 as NETCONA Device 700 sits in front of Router 200 to trap any OOB messages intended for NETCONA Device 700. All other traffic is passed transparently to Router 200 and its IP address. All such pass-through data remain "untouched" using pack forwarding commands built into the IP stack of NETCONA Device 700, similar to how a network switch works. Packet forwarding is the relaying of packets from one network segment to another by nodes in a computer network. NETCONA Device 700 applies this technology in a slightly different way to "peel off" OOB traffic. In view of their transitory nature, data traffic and data packets are represented in FIGS. 1-5 by the solid lines depicting connections 110, 115, 240, 340, 440, 940 and accesses 630, 840.

The two network interfaces 710, 720 on NETCONA Device 700 will act as a network switch, transparently forwarding data from WAN Port 100 to Router 200, and from Router 200 to WAN Port 100. When a particular TCP port is addressed on NETCONA Device 700 (an example would be "SSH port 23"), NETCONA Device 700 will intercept the packet and route it to an Out of Band Management module in NETCONA Device 700, where the packet will be authenticated and passed to the appropriate Serial Console Access Port 730 for console port access.

There are several advantages to placing NETCONA Device 700 "in-line" with the circuit that are not available in the prior art, which does not use this configuration. All prior art configurations use devices that are "attached" to the network using a separate IP address. Acting like a switch spares NETCONA Device 700 the need for an additional IP address, which is critical in today's IP-address-consuming environment filling with cloud connections requiring IP addresses, which are running out and becoming more costly. As a result, a network configuration in accordance with the invention need only have a single IP address at the network edge point, like in FIG. 4, as opposed to two or three IP addresses, as in FIGS. 1-3.

Further advantages may include the following aspects. NETCONA Device 700 may be completely transparent to the network. NETCONA Device 700 may pass all data between WAN Port 100 and Router 200, and between Router 200 and WAN Port 100. NETCONA Device 700 may activate only when the OOB port is accessed. NETCONA Device 700 may use security greater in strength than a standard firewall. All security may be built in NETCONA Device 700, so as not to rely on the network for operation, allowing NETCONA Device 700 to securely run out in front of Router 200. NETCONA Device 700 may use strong two factor authentication to secure the Out of Band access. NETCONA Device 700 may use strong encryption to secure the Out of Band access. For additional security, NETCONA Device 700 may use Private key technology that is never shared in clear text form. NETCONA Device 700 may be paired with a client device at an NOC to provide hardware level security between the two points on the network; pairing may be one-to-many so the NOC can have just a few client devices accessing thousands of remote devices. Such security measures may reduce or prevent any intrusion through NETCONA access ports. All CLI commands performed on each console access port may be captured and sent back to a central server for later audit by a security professional.

FIG. 5 shows a schematic block diagram of a Fifth Network Configuration 5000, configured in accordance with aspects of the invention. Fifth Network Configuration 5000 includes NETCONA Power Control Port 740 and a NETCONA Telco Port 750 in NETCONA Device 700. Fifth Network Configuration 5000 also includes a Power Control Module 800 that may include a Power Control Module Access Port 810, a Power Control Module Power Input 820, and a Power Control Module Power Output 830. NETCONA Power Control Port 740 may be connected to Power Control Module Access Port 810 to generate a Power Control Access 840. Power Control Access 840 would be a further example of a Management Access generated by a NETCONA Management Port. Over Power Control Access 840, NETCONA Device 700 may turn on and turn off Power Control Module 800, which in turn may connect and disconnect a Power Connection 850 between a Power Supply 860 and, for instance, Router Power Input 250, Firewall Power Input 350, Network Switch Power Input 450, or Network Appliance Power Input 570. Turning power off and then on again may be used to reboot a remote device that may have malfunctioned, or that may have been updated or otherwise managed over Serial Console Access 630. NETCONA Device 700 may provide a power reset or power cycle of the remote network devices of the NOC center requires. It is possible that an embodiment of the present invention may include NETCONA Power Control Ports 740 instead of, and to the exclusion of, NETCONA Serial Console Access Ports 730, effectively making such a NETCONA Device 700 a remote power management system without any serial console access, even though the name NETCONA is derived from the words Console Access.

Fifth Network Configuration 5000, configured in accordance with aspects of the invention, also includes a Telco Network 900 as a backup circuit for communication between an NOC and NETCONA Device 700. Alternatively, Telco Network 900 may be replaced by Redundant WAN Port 105 for provision of Redundant, Backup Raw WAN Connection 115, as in FIG. 3. The NOC may include a Telco Network Modem 910 having a Telco Network Modem Telco-side Port 920 and a Telco Network Modem LAN-side Port 930. A Telco Network Connection 940 may connect Telco Network Modem Telco-side Port 920 with Telco Network 900, and Telco Network 900 with NETCONA Telco Port 750. Telco Network 900 may include, for instance, a PSTN landline or a wireless network (e.g., Wi-Fi, Wi-Max, or Cellular Network), as a backup means of requesting Serial Console Access 630 from NETCONA Serial Console Access Port 730, or even as a backup means of providing Raw WAN Connection 110 from NETCONA LAN-side Port 720.

As shown in FIG. 5, the NOC may also include a second Router 200 that interconnects over Raw WAN Connection 110 with WAN Port 100, and over Routed LAN Connection 240 with Telco Network Modem LAN-side Port 930, OBM Secure Terminal 530, Application Server 540 running OBM Software 545, Database Server 550, and Authentication Server 560. Network Appliances 530, 540, 550, and 560 may comprise the OBM infrastructure at the NOC, and this OBM infrastructure may perform out-of-band management either over Raw WAN Connection 110 or over Telco Network Connection 940.

Embodiments of methods in accordance with the present invention may include configuring a network system to include NETCONA Device 700, providing NETCONA Device 700 functionality, and/or using NETCONA Device 700 for OOB Management. For instance, a network system may be configured to include NETCONA Device 700, with or without a Telco Network 900 or a Redundant/Backup WAN Port 105 as a backup means of accessing NETCONA Device 700. Similarly, a network system may be configured to include power management using Power Control Module 800 irrespective of whether a backup means 105, 900 and backup connection 115, 940 are included in the configuration. NETCONA Device 700 functionality may be provided as a stand-alone device or integrated in a multi-functional device that may include, for instance, routing functionality. Using NETCONA Device 700 for OBM might be viewed either at the remote device level, or at the network level.

Viewed at the network level, when an NOC wants to access Network Appliance Serial Console Access Port 520 on remote Network Appliance 500, the NOC may use a client CDI device, such as OBM Secure Terminal 530, located at the NOC to initiate a raw TCP connection to a specific port on the WAN interface of the remote NETCONA Device 700. This specific port may intercept the connection and direct it to NETCONA Management Module 705 of NETCONA Device 700. NETCONA Management Module 705 processes all data packets intended for use in generating Serial Console Access 630. The NOC connection may be authenticated using built-in two factor authentication between the NOC Client device and NETCONA Device 700. The two factor authentication may communicate with a CDI client device at the NOC to confirm that the connection is allowable, which may be done using a cryptographic algorithm and a private key already programmed into each end. Depending on the security setup, the connection may become encrypted by NETCONA Device 700 and the Client device at the NOC using available encryption algorithms like AES. The NOC user may be presented with a list of allowable ports to be accessed on NETCONA Device 700. The NOC user may select the desired port and perform CLI functions to the network appliance. The NOC user might access, for instance, a NETCONA Serial Console Access Port 730 to generate Serial Console Access 630, or a NETCONA Power Control Port 740 to generate Power Control Access 840. All CLI functions may be logged (e.g., by keystroke) to be sent back to the central manager for later audit by a systems administrator or security officer. Meanwhile, the main Raw WAN Connection 110 to Router 200 is still passing traffic transparently during this process and does not affect any remote site traffic.

The foregoing description discloses exemplary embodiments of the invention. While the invention herein disclosed has been described by means of specific embodiments and applications thereof, numerous modifications and variations could be made thereto by those skilled in the art without departing from the scope of the invention set forth in the claims. Modifications of the above disclosed apparatus and methods that fall within the scope of the invention will be readily apparent to those of ordinary skill in the art. Accordingly, other embodiments may fall within the spirit and scope of the invention, as defined by the following claims.

In the description above, numerous specific details are set forth in order to provide a more thorough understanding of embodiments of the invention. It will be apparent, however, to an artisan of ordinary skill that the invention may be practiced without incorporating all aspects of the specific details described herein. In other instances, specific details well known to those of ordinary skill in the art have not been described in detail so as not to obscure the invention. Readers should note that although examples of the invention are set forth herein, the claims, and the full scope of any equivalents, are what define the metes and bounds of the invention.

| REFERENCE NUMERAL LIST: | |
| --- | --- |
| First Network Configuration, configured according to the Prior Art | 1000 |
| Second Network Configuration, configured according to the Prior Art | 2000 |
| Third Network Configuration, configured according to the Prior Art | 3000 |
| Fourth Network Configuration, configured according to the Invention | 4000 |
| Fifth Network Configuration, configured according to the Invention | 5000 |
| WAN Port (Internet)(Modem Output) | 100 |
| Redundant WAN Port (Internet)(Modem Output) | 105 |
| Raw WAN Connection | 110 |
| Redundant/Backup Raw WAN Connection | 115 |
| Router | 200 |
| Router WAN-side Port | 210 |
| Router LAN-side Port | 220 |
| Router Serial Console Access Port | 230 |
| Routed LAN Connection | 240 |
| Router Power Input | 250 |
| Firewall | 300 |
| Firewall WAN-side Port | 310 |
| Firewall LAN-side Port | 320 |
| Firewall Serial Console Access Port | 330 |
| Firewalled Routed LAN Connection | 340 |
| Firewall Power Input | 350 |
| Network Switch | 400 |
| Network Switch WAN-side Port | 410 |
| Network Switch LAN-side Port | 420 |
| Network Switch Serial Console Access Port | 430 |
| Switched Firewalled Routed LAN Connection | 440 |
| Network Switch Power Input | 450 |
| Network Appliance | 500 |
| Network Appliance Network Port | 510 |
| Network Appliance Serial Console Access Port | 520 |
| OBM Secure Terminal | 530 |
| Application Server | 540 |
| OBM Management Software | 545 |
| Database Server | 550 |
| Authentication Server | 560 |
| Network Appliance Power Input | 570 |
| Terminal Server | 600 |
| Terminal Server Network Port | 610 |
| Terminal Server Redundant/Backup Network Port | 615 |
| Terminal Server Serial Console Access Port | 620 |
| Serial Console Access | 630 |
| NETCONA Inline Network Switch and Console Access Device | 700 |
| NETCONA Management Module | 705 |
| NETCONA WAN-side Port | 710 |
| NETCONA LAN-side Port | 720 |
| NETCONA Serial Console Access Port | 730 |
| NETCONA Power Control Port | 740 |
| NETCONA Telco Port | 750 |
| Power Control Module | 800 |
| Power Control Module Access Port | 810 |
| Power Control Module Power Input | 820 |
| Power Control Module Power Output | 830 |
| Power Control Access | 840 |
| Power Connection | 850 |
| Power Supply | 860 |
| Telco Network | 900 |
| Telco Network Modem | 910 |
| Telco Network Modem Telco-side Port | 920 |
| Telco Network Modem LAN-side Port | 930 |
| Telco Network Connection | 940 |

What is claimed is:

1. A network switch comprising:
   an in-line Network Console Access (NETCONA) Device having a NETCONA Management Module, a NETCONA WAN-side Port, a NETCONA LAN-side Port, a Power Control Module, and at least one NETCONA Management Port;
   wherein the NETCONA Device is configured to generate Management Access from the at least one NETCONA Management Port;
   wherein the NETCONA Device shares an IP address with at least one router coupled with the NETCONA Device, wherein the NETCONA Device is configured to isolate packets sent to a specific port of the NETCONA Device and allow all other packets to pass through the NETCONA Device to the at least one router having the shared IP address; and
   wherein the NETCONA Device is configured to power cycle one or more remote network devices using the Power Control Module, enabling the NETCONA Device to reboot the one or more remote network devices.

2. The network switch of claim 1,
   wherein the NETCONA Management Port comprises a NETCONA Serial Console Access Port; and
   wherein the NETCONA Device is configured to generate Serial Console Access from the NETCONA Serial Console Access Port.

3. The network switch of claim 2,
   wherein the switch uses packet forwarding to transfer data between the NETCONA WAN-side Port and the NETCONA LAN-side Port;

intercept console access data packets having serial console access instructions; and forward these console access data packets to the NETCONA Management Module; and wherein the NETCONA Management Module is configured to process console access data packets, and use the at least one NETCONA Serial Console Access Port to generate Serial Console Access.

4. The network switch of claim 1, wherein the NETCONA Management Port comprises a NETCONA Power Control Port; and wherein the NETCONA Device is configured to generate Power Control Access from the NETCONA Power Control Port.

5. The network switch of claim 1, wherein the NETCONA Device further comprises:

a NETCONA Telco Port.

6. A network system comprising a network configuration, wherein the system comprises:

an in-line NETCONA Device, the NETCONA Device shares an IP address with at least one router present in the system, and at least one Network Appliance;

wherein the NETCONA Device comprises a switch having a NETCONA Management Module, a NETCONA WAN-side Port, a NETCONA LAN-side Port, a Power Control Module, and at least one NETCONA Serial Console Access Port;

wherein the at least one Network Appliance includes a Network Appliance Serial Console Access Port;

wherein the at least one router is coupled with the NETCONA LAN-side port; and wherein the NETCONA Serial Console Access Port is coupled with the Network Appliance Serial Console Access Port;

wherein the NETCONA Device is configured to isolate packets sent to a specific port of the NETCONA Device and all other packets are allowed to pass through NETCONA Device to the at least one router having the shared IP address; and wherein the NETCONA Device is configured to power cycle one or more remote network devices using the Power Control Module, enabling the NETCONA Device to reboot the one or more remote network devices.

7. The network system of claim 6, wherein the NETCONA Device uses packet forwarding to transfer data between the NETCONA WAN-side Port and the NETCONA LAN-side Port;

intercept console access data packets having serial console access instructions; and forward these console access data packets to the NETCONA Management Module; and wherein the NETCONA Management Module is configured to process console access data packets, and use the at least one NETCONA Serial Console Access Port to generate Serial Console Access to the Network Appliance Serial Console Access Port.

8. The network system of claim 6, wherein the NETCONA Device further comprises a NETCONA Power Control Port; and wherein the NETCONA Device is configured to generate Power Control Access from the NETCONA Power Control Port to a Power Control Module coupled to the Network Appliance.

9. The network system of claim 6, wherein the NETCONA Device further comprises:

a NETCONA Telco Port.

10. The network system of claim 6, further comprising:

a WAN Port, a Firewall, and a Network Switch;

wherein the NETCONA WAN-side Port is coupled to the WAN Port;

wherein the NETCONA LAN-side Port is coupled to a Router WAN-side Port on the Router;

wherein a Router LAN-side Port on the at least one router is coupled to a Firewall WAN-side Port on the Firewall; and wherein a Firewall WAN-side Port on the Firewall is coupled to a Network Appliance Network Port on the Network Appliance.

11. A method of configuring a network switch, the method comprising:

providing a NETCONA Device having a NETCONA Management Module, a NETCONA WAN-side Port, a NETCONA LAN-side Port, a Power Control Module, and at least one NETCONA Serial Console Access Port;

configuring the NETCONA Device to use packet forwarding to transfer data between the NETCONA WAN-side Port and the NETCONA LAN-side Port;

configuring the NETCONA Device to intercept console access data packets having serial console access instructions and forward these console access data packets to the NETCONA Management Module, wherein the serial console access instructions are designated to a specific port of a router and configured to establish a TCP connection to the NETCONA Device and cause a two factor authentication protocol to be implemented to establish an operative connection, and wherein the NETCONA Device is configured to power cycle one or more remote network devices using the Power Control Module, enabling the NETCONA Device to reboot the one or more remote network devices;

configuring the NETCONA Management Module to process console access data packets; and configuring the NETCONA Management Module to use the at least one NETCONA Serial Console Access Port to generate Serial Console Access.

12. The method of claim 11, further comprising:

providing at least one NETCONA Power Control Port on the NETCONA Device;

configuring the NETCONA Device to intercept power control data packets having power control instructions and forward these power control data packets to the NETCONA Management Module;

configuring the NETCONA Management Module to process power control data packets; and configuring the NETCONA Management Module to use the at least one NETCONA Power Control Port to generate Power Control Access.

13. The method of claim 11, further comprising:

providing a NETCONA Telco Port on the NETCONA Device;

receiving Telco data packets from the NETCONA Telco Port; and configuring the NETCONA Device to intercept Telco data packets comprising console access data packets and forward these console access data packets to the NETCONA Management Module.

14. The method of claim 13, further comprising:
providing at least one NETCONA Power Control Port on the NETCONA Device;
configuring the NETCONA Device to intercept Telco data packets comprising power control data packets and forward these power control data packets to the NETCONA Management Module;
configuring the NETCONA Management Module to process power control data packets; and
configuring the NETCONA Management Module to use the at least one NETCONA Power Control Port to generate Power Control Access.

15. A method of configuring a network system, the method comprising:
providing a NETCONA Device having a NETCONA Management Module, a NETCONA WAN-side Port, a NETCONA LAN-side Port, a Power Control Module, and at least one NETCONA Serial Console Access Port,
wherein the NETCONA Device shares an IP address with a router of the network system;
providing at least one Network Appliance having a Network Appliance Serial Console Access Port; and
coupling the NETCONA Serial Console Access Port with the Network Appliance Serial Console Access Port;
wherein the serial console access instructions are designated to a specific port of a router and configured to establish a TCP connection to the NETCONA Device and cause a two factor authentication protocol to be implemented to establish an operative connection, and
wherein the NETCONA Device is configured to power cycle one or more remote network devices using the Power Control Module, enabling the NETCONA Device to reboot the one or more remote network devices.

16. The method of claim 15, further comprising:
using packet forwarding to transfer data between the NETCONA WAN-side Port and the NETCONA LAN-side Port;
intercepting data packets having serial console access instructions;
forwarding these data packets to the NETCONA Management Module;
processing these data packets with the NETCONA Management Module; and
generating Serial Console Access from the at least one NETCONA Serial Console Access Port to the Network Appliance Serial Console Access Port.

17. The method of claim 15, further comprising:
providing a WAN Port, a Firewall, and a Network Switch;
coupling the NETCONA WAN-side Port to the WAN Port;
coupling the NETCONA LAN-side Port to a Router WAN-side Port on the Router;
coupling a Router LAN-side Port on the Router to a Firewall WAN-side Port on the Firewall; and
coupling a Firewall WAN-side Port on the Firewall to a Network Appliance Network Port on the Network Appliance.

18. A method of performing console access management comprising:
transferring data packets through a NETCONA Device having a NETCONA Management Module, a NETCONA WAN-side Port, a NETCONA LAN-side Port, a Power Control Module, and at least one NETCONA Serial Console Access Port,
wherein the NETCONA Device shares an IP address with at least one router;
using packet forwarding to transfer the data packets between the NETCONA WAN-side Port and the NETCONA LAN-side Port;
intercepting data packets having serial console access instructions,
wherein the serial console access instructions are designated to a specific port of a router and configured to establish a TCP connection to the NETCONA Device and cause a two factor authentication protocol to be implemented to establish an operative connection, and
wherein the NETCONA Device is configured to power cycle one or more remote network devices using the Power Control Module, enabling the NETCONA Device to reboot the one or more remote network devices;
forwarding these data packets to the NETCONA Management Module;
processing these data packets with the NETCONA Management Module; and
generating Serial Console Access from the at least one NETCONA Serial Console Access Port to a Network Appliance Serial Console Access Port coupled to the at least one NETCONA Serial Console Access Port.

19. The method of claim 18, further comprising:
generating Power Control Access from an at least one NETCONA Power Control Port within the NETCONA Device to a Power Control Module having a Power Control Module Access Port coupled to the at least one NETCONA Power Control Port.

20. The method of claim 18, further comprising:
transferring data packets through a NETCONA Telco Port within the NETCONA Device.

* * * * *